United States Patent
Okubo et al.

(10) Patent No.: US 6,607,687 B1
(45) Date of Patent: Aug. 19, 2003

(54) PROCESS FOR PRODUCING MOLDED ARTICLE

(75) Inventors: Makoto Okubo, Wakayama (JP); Kazuhiko Kiuchi, Wakayama (JP); Ryoichi Hashimoto, Wakayama (JP); Takayuki Nomura, Wakayama (JP); Masahiro Mori, Wakayama (JP); Kenichi Miyamoto, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/674,149

(22) PCT Filed: Apr. 27, 1999

(86) PCT No.: PCT/JP99/02259

§ 371 (c)(1), (2), (4) Date: Oct. 27, 2000

(87) PCT Pub. No.: WO99/55510

PCT Pub. Date: Nov. 4, 1999

(30) Foreign Application Priority Data

Apr. 28, 1998 (JP) ............................................. 10-119095

(51) Int. Cl.⁷ ...................... B29C 33/60; C10M 171/00
(52) U.S. Cl. ................... 264/300; 264/331.19; 264/338
(58) Field of Search ............................ 264/300, 331.19, 264/338

(56) References Cited

U.S. PATENT DOCUMENTS

| | | |
|---|---|---|
| 4,157,990 A | 6/1979 | Lindner et al. |
| 5,670,553 A | 9/1997 | Mackey |

FOREIGN PATENT DOCUMENTS

| | | |
|---|---|---|
| EP | 0604176 A1 | 6/1994 |
| EP | 0735092 A2 | 10/1996 |
| EP | 0765721 A2 | 4/1997 |
| JP | 55-42091 B2 | 10/1980 |
| JP | 7-60811 A | 3/1995 |
| JP | 7-214587 A | 8/1995 |
| JP | 7-329099 A | 12/1995 |
| JP | 10-128861 A | 5/1998 |

OTHER PUBLICATIONS

Abstract of Japan 09286644 (Published Nov. 4, 1997).

*Primary Examiner*—Leo B. Tentoni
(74) *Attorney, Agent, or Firm*—Birch, Stewart, Kolasch & Birch, LLP

(57) ABSTRACT

Process for producing a molded article comprising pouring or injecting a liquid molding material into a mold in the presence of a surface-treating agent comprising a contact angle-reducing substance under the condition that the contact angle between the liquid molding material and the inner surface of the mold is not more than 30°, and curing the liquid molding material; surface-treating agent comprising a contact angle-reducing substance which reduces the contact angle between the liquid molding material and a flat plate made of the same material as the mold to not more than 30°; method for reducing surface voids during molding, comprising using the above surface-treating agent; and use of the above surface-treating agent for reducing surface voids. The molded article has a shape accurately corresponding to the shape of an inner surface of a mold.

8 Claims, No Drawings

PROCESS FOR PRODUCING MOLDED ARTICLE

This application is the national phase under 35 U.S.C. §371 of PCT International Application No. PCT/JP99/02259 which has an International filing date of Apr. 27, 1999, which designated the United States of America.

TECHNICAL FIELD

The present invention is directed to a process for producing a molded article, and more particularly to a process for producing a molded article, capable of producing a molded article having a shape accurately corresponding to the shape of an inner surface of a mold, and a surface-treating agent used in the process.

BACKGROUND ART

When a molded article is produced by pouring or injecting a liquid molding material into a mold, and curing the liquid molding material, a mold releasing agent has been hitherto applied to the inner surface of the mold in order to easily release a molded article from the mold.

However, when a mold releasing agent is applied to the inner surface of a mold having a complicated shape on its inner surface, and a molded article is produced, the surface properties of the molded article are sometimes deteriorated because so-called surface void, i.e. surface defect caused by insufficient filling of the liquid starting materials and/or foams into the mold having a complicated shape on its inner surface is generated.

An object of the present invention is to provide a process for producing a molded article, capable of producing a molded article having a shape accurately corresponding to the shape of an inner surface of a mold, without the generation of defects which lower the surface properties of a molded article, such as surface void on the surface of the molded article.

The above and other objects of the present invention will be apparent from the following description.

DISCLOSURE OF INVENTION

The present invention is directed to the following:

[1] a process for producing a molded article comprising,
 (A) pouring or injecting a liquid molding material into a mold in the presence of a surface-treating agent comprising a contact angle-reducing substance under the condition that the contact angle between the liquid molding material and the inner surface of the mold is not more than 30°, and
 (B) curing the liquid molding material;

[2] a surface-treating agent used in a process for producing a molded article comprising pouring or injecting a liquid molding material into a mold and curing the liquid molding material, comprising a contact angle-reducing substance which reduces the contact angle between the liquid molding material and a flat plate made of the same material as the mold to not more than 30°, when the liquid molding material containing the surface-treating agent is dropped on the flat plate, or when the surface-treating agent is applied to the flat plate and the liquid molding material is dropped thereon;

[3] a method for reducing surface voids during molding, comprising using the above surface-treating agent; and

[4] use of the above surface-treating agent for reducing surface voids.

BEST MODE FOR CARRYING OUT THE INVENTION

Typical examples of the liquid molding materials are resins such as polyurethanes, epoxy resins, phenolic resins, polyesters, urea resins, olefinic resins such as polyethylenes and polypropylenes, and styrenic resins; rubbers such as natural rubbers, isoprene rubbers, chloroprene rubbers, styrene-butadiene rubbers, butadiene rubbers, acrylonitrile-butadiene rubbers, ethylene-propylene rubbers, butyl rubbers, and acrylic rubbers.

The liquid molding materials can be those which are foamed during molding to give a foamed molded article. The liquid molding materials which give a foamed molded article include self-foamable polyurethanes, foamable olefinic resins, foamable styrene resins, or the like. When the olefinic resins, the styrene resins, or the like are used, there can be employed a process comprising foaming pre-foamed resin particles, or a process comprising impregnating a foaming agent into those resins, and thereafter molding and foaming the resins in a mold.

The process of the present invention exhibits excellent effects for liquid molding materials, particularly polyurethanes, the surface properties of which are easily deteriorated during molding. Typical examples of the polyurethanes are, for instance, polyether polyurethanes, polyester polyurethanes, and the like.

The starting materials for the polyurethane are not particularly limited, and known ones can be used. It is desired that the starting materials for the polyurethane are a polyol solution and an isocyanate prepolymer. The polyol solution comprises a polyol component, such as a polyether-polyol or a polyester-polyol, a chain extender, water, a foam stabilizer (a surfactant), and, as occasion demands, a catalyst. The isocyanate prepolymer can be prepared from a polyol component such as a polyether-polyol or a polyester-polyol, and a polyisocyanate component such as methylenediphenyl diisocyanate or a modified compound thereof. The polyether-polyol, the polyester-polyol, the chain extender, the foam stabilizer (a surfactant), the catalyst, the polyisocyanate component, and the isocyanate prepolymer may be those which are known. The contact angle-reducing substance can be contained in the isocyanate prepolymer and/or the polyol solution, and it is desired that the contact angle-reducing substance is contained in the isocyanate prepolymer. The content of the contact angle-reducing substance in the isocyanate prepolymer is preferably 0.1 to 7% by weight, more preferably 0.1 to 5% by weight.

The polyurethane foam containing the contact angle-reducing substance can be produced by reacting the polyol component with components such as the polyisocyanate component, the isocyanate prepolymer, and as occasion demands, water, a chain extender, a foam stabilizer (a surfactant), a catalyst, and the like, in the presence of the contact angle-reducing substance.

In the present invention, one of the major features resides in that the liquid molding material is poured or injected into a mold in the presence of a surface-treating agent comprising a contact angle-reducing substance under the condition that the contact angle between the liquid molding material and the inner surface of the mold is not more than 30°, and the liquid molding material is cured. When molded under this condition, there can be exhibited an excellent effect that a molded article having a shape accurately corresponding to the shape of the inner surface of a mold can be produced, without the generation of surface voids in the molded article. The reasons why this excellent effect is exhibited are not clear, but it is presumably based on the following. When the contact angle between the liquid molding material and the inner surface of the mold is reduced to not more than 30°, the wettability of the mold by the liquid molding material is improved, and thereby the friction between the liquid molding material and the mold is reduced. As a result, the liquid molding material can flow into the mold to follow the complicated shape of the inner surface of the mold. It is desired that the contact angle between the liquid molding material and the inner surface of the mold is not more than 23°, particularly not more than 21°, from the viewpoint of the reducing surface voids of the resulting molded article.

It is desired that the surface-treating agent comprises a contact angle-reducing substance, which reduces the contact angle between the liquid molding material and a flat plate made of the same material as the mold to not more than 30° when the liquid molding material containing the surface-treating agent is dropped on the flat plate, or when the surface-treating agent is applied to the flat plate and the liquid molding material is dropped thereon. When this surface-treating agent is used, surface voids during molding can be reduced. More concretely, when the surface-treating agent is used, there can be exhibited an excellent effect that a molded article having a shape accurately corresponding to the shape of the inner surface of the mold can be easily produced without the generation of surface voids in the resulting molded article. The reasons why this excellent effect is exhibited are not clear, but it is presumably based on the following. The wettability of the mold by the liquid molding material is improved by the surface-treating agent, and thereby the friction between the liquid molding material and the mold is reduced. As a result, the liquid molding material can flow into the mold to follow the complicated shape of the inner surface of the mold. It is desired that the contact angle between the surface-treating agent and the inner surface of the mold is not more than 23°, particularly not more than 21°.

The contact angle can be determined in accordance with the following procedures.
1) The measurement atmosphere is kept windless at 25° C. and 55% RH.
2) As the flat plate made of the same material as the mold, an aluminum plate [average roughness Ra: 0.2–0.4 μm] is horizontally arranged. Thereafter, a silicone mold releasing agent is sprayed on its surface, and sufficiently wiped off with a waste cloth.
3) A given surface-treating agent is uniformly sprayed in the amount of 10 g/m² on the silicone mold releasing agent-sprayed surface (surface-treating agents which are solid at 25° C. are previously heated to a temperature not lower than their melting points to melt and then sprayed).
4) The liquid molding material previously degassed by evacuation is collected with a syringe, and one droplet is dropped on the flat plate from the height of 10 cm from the surface of the flat plate in a manner so that the droplet of the liquid molding material has the weight of 0.10±0.02 g.
5) The time at which the droplet reaches the surface of the flat plate is counted as zero second. The change of the droplet is observed in accordance with the passage of time from the sideways direction of the droplet with a microscope as a CCD camera. After 60 seconds passed, the contact angle between the droplet and the flat plate is measured.

Examples of the contact angle-reducing substance include at least one compound selected from the group consisting of esters, ethers and amides, each having a boiling point of not less than 50° C., preferably not less than 100° C. at normal pressure, in particular a boiling point of not less than 100° C. at normal pressure and a boiling point of not more than 300° C. under the pressure of 0.133 kPa. Among the contact angle-reducing substances, those having vapor pressures of a level which does not completely evaporate within the working hours are preferable.

Examples of the ester having a boiling point of not less than 50° C. include alkyl stearates wherein an alcohol residue moiety of the ester has 1 to 22 carbon atoms, such as ethyl stearate and butyl stearate; alkyl acetates wherein an alcohol residue moiety of the ester has 4 to 22 carbon atoms, such as decyl acetate and octadecyl acetate; alkyl oleates wherein an alcohol residue moiety of the ester has 1 to 22 carbon atoms, such as methyl oleate and butyl oleate; and other alkyl esters of fatty acids wherein the fatty acid residue moiety of the ester has an alkyl group of 2 to 21 carbon atoms, and the alcohol residue moiety of the ester has 1 to 22 carbon atoms, such as butyl propionate, butyl 2-ethylhexanoate, ethyl decanoate and methyl linoleate. Those esters can be used alone or in an admixture thereof. Among them, from the viewpoints of imparting an excellent effect of suppressing generation of surface voids to a resulting molded article and thus improving its appearance (design), alkyl esters of fatty acids, formed from a fatty acid and a monohydric alcohol, such as ethyl stearate, butyl stearate, decyl acetate, octadecyl acetate, methyl oleate and butyl acetate, can be suitably used. Further, it is desired that the fatty acid has 2 to 22 carbon atoms, preferably 2 to 18 carbon atoms, and that the monohydric alcohol has 1 to 22 carbon atoms, preferably 1 to 18 carbon atoms. Moreover, it is desired that the total number of carbon atoms of the fatty acid and the monohydric alcohol is 10 to 40, preferably 12 to 36. In addition, from the viewpoint of yellowing resistance of the resulting molded article, alkyl esters of saturated fatty acids, such as butyl stearate and octadecyl acetate, can be particularly suitably used.

The ester having a boiling point of not less than 50° C. may be a symmetric ether or asymmetric ether. Examples thereof include dioctyl ether, dibutyl ether, dihexyl ether, didecyl ether, butyl hexyl ether, and the like. Those esters may be used alone or in an admixture thereof. Among them, from the viewpoints of imparting an excellent effect of suppressing generation of surface voids to a resulting molded article and thus improving its appearance (design), dioctyl ether, and the like can be suitably used.

The content of the contact angle-reducing substance in the surface-treating agent may be appropriately adjusted so that the contact angle between the liquid molding material and the flat plate is reduced to not more than 30°, preferably not more than 23°, more preferably not more than 21°. Incidentally, the contact angle-reducing substance itself can be solely used as the surface-treating agent, since the contact angle between the liquid molding material and the flat plate can be reduced to not more than 30°, even when the contact angle-reducing substance is used alone as the surface-treating agent.

The surface-treating agent may contain a mold releasing agent such as a silicone compound or a wax as occasion demands, in addition to the contact angle-reducing substance. The surface-treating agent containing the contact angle-reducing substance and the mold releasing agent can be desirably used by applying it to the inner surface of the mold during the production of various molded articles because this surface-treating agent suppresses the generation of surface voids, and improves the appearance (design) of the molded article.

The silicone compound can be suitably used in the present invention because the silicone compound is excellent in liquidity and releasing properties, and moreover is durable for repetitious use. Typical examples of the silicone compound include dimethyl silicone oil, and modified silicone oils such as alkyl-modified silicone oils and higher fatty acid-modified silicone oils, or those diluted with a solvent, those prepared into aqueous emulsions, and the like. Concretely, there can be cited dimethyl silicone oil having a viscosity of 30 to 5000 mm²/s at 25° C. Those silicone compounds can be used alone or in an admixture thereof.

The wax can be suitably used because it is inexpensive. Examples of the wax include mineral oils, olefinic waxes, paraffin waxes, and the like. Those waxes can be used alone or in admixture thereof. Among them, the mineral oils and paraffin waxes each having a molecular weight of not less than 300 are preferable.

Among the mold releasing agents, the silicone compounds are more preferable from the viewpoint of the releasing property.

The content of the mold releasing agent in the surface-treating agent cannot be absolutely determined because it differs depending upon their kinds. However, it is desired that the content is usually not less than 5% by weight, preferably not less than 10% by weight, more preferably not less than 30% by weight, from the viewpoint of exhibiting sufficient releasing properties. Also, it is desired that the content is not more than 95% by weight, preferably not more than 90% by weight, from the viewpoint of exhibiting sufficient surface properties.

The surface-treating agent can be applied to the inner surface of the mold, or it can be contained in the liquid molding material.

When the surface-treating agent is applied to the inner surface of the mold, an outsole of shoe soles made of a polyurethane foam having complicated shapes particularly in the bottom surface can be formed in a shape exactly conforming to the mold without the generation of defects which impair the surface properties of the molded article, such as surface void.

The method for applying the surface-treating agent to the inner surface of the mold includes, for instance, a method of coating, spraying, dipping, or the like, without limiting the present invention to those methods above.

When the surface-treating agent is applied to the inner surface of the mold, the mold is filled with the liquid molding material thereafter, and can be molded under given molding conditions suitable for the kinds of the liquid molding material, and the like. It is desired that the amount of the surface-treating agent applied to the inner surface of the mold is 3 to 30 g/m² from the viewpoints of imparting sufficient surface properties to a resulting molding article and preventing cracking and dulling of the surface.

When the surface-treating agent is contained in the liquid molding material, a midsole of shoe soles, made of a polyurethane foam and particularly having a complicated shape in the side surfaces can be molded in a shape exactly conforming to the mold without the generation of the defects which impair the surface properties of the molded article, such as surface void.

When the surface-treating agent is contained in the liquid molding material, the content of the surface-treating agent in the liquid molding material differs depending upon the kinds of the liquid molding material. However, it is desired that the content is adjusted so that the contact angle between the liquid molding material and the flat plate made of the same material as the mold is not more than 30°. For instance, it is desired that the content of the contact angle-reducing substance in the liquid molding material is 0.05 to 3.5% by weight, preferably 0.25 to 1% by weight.

When the surface-treating agent is contained in the liquid molding material, the liquid molding material is filled in the mold, and can be molded under given molding conditions suitable for the kinds of the liquid molding material.

The materials of the mold which can be used in the present invention are not particularly limited. Examples of such materials include iron, stainless steel, copper, aluminum, aluminum alloys, epoxy resins, phenolic resins, and the like. In addition, the shapes of the inner surface of the mold are not particularly limited, and any arbitrary shape can be selected as long as the inner surface has a shape well corresponding to the shape of the desired molded article.

When the liquid molding material is molded in a mold, it is desirable to previously apply a mold releasing agent to the inner surface of the mold by means of coating, spraying, dipping, or the like in order to improve its releasing property. The mold releasing agent includes dimethyl silicone oil, mineral oils, paraffin waxes, and the like, without intending to limit the present invention to those exemplified above.

Thus, a molded article having a given shape can be obtained by molding and subsequent demolding. The resulting molded article has excellent surface properties because the generation of harmful defects such as surface void is suppressed even when the molded article has a complicated shape in its inner surface.

Especially, when the molded article is a molded article made of a polyurethane foam, the above-mentioned effects are exhibited even more excellently. Particularly, the above effects are even more remarkably exhibited for the polyurethane foam for shoe soles having complicated shapes in the bottom surface or side surfaces.

In general, the shoe soles can be classified into outsoles used in sandals and men's shoes, and midsoles used in sports shoes. The effects according to the present invention can be remarkably exhibited particularly in midsoles used within a low density region.

From the viewpoint of reducing surface voids, the density of the polyurethane foam is preferably not less than 0.15 g/cm³ and less than 0.30 g/cm³, and more preferably not less than 0.20 g/cm³ and less than 0.30 g/cm².

Preparation Example 1

Preparation of Liquid Molding Material for Polyether Polyurethane Foam

In a mixer (Model "DH-2.5," manufactured by Tokushu Kika Kogyo K.K.) were previously stirred 50 parts by weight of a polyol solution [trade name: "EDDYFOAM AS-2045," manufactured by Kao Corporation], comprising polypropylene glycol, a chain extender, water and a foam stabilizer (a surfactant), and 50 parts by weight of an isocyanate prepolymer [trade name: "EDDYFOAM B-6009N," manufactured by Kao Corporation], main constituents of which were polypropylene glycol and 4,4-diphenylmethane diisocyanate, and the resulting mixture was evacuated in a desiccator.

The resulting liquid mixture was used to measure a contact angle in accordance with the following method for measurement of a contact angle. As a result, the contact angle was found to be 43°.

The viscosity of this liquid mixture gradually increases. Therefore, the time period from the previous stirring of the polyol solution and the isocyanate prepolymer to the measurement of the contact angle was adjusted to four minutes.

Preparation Example 2

Preparation of Liquid Molding Material for Polyester Polyurethane Foam

In a mixer (Model "DH-2.5," manufactured by Tokushu Kika Kogyo K.K.) were previously stirred 50 parts by weight of a polyol solution [trade name: "EDDYFOAM AS-1210U," manufactured by Kao Corporation], comprising a polyester-polyol, a chain extender, water and a foam stabilizer (a surfactant), and 50 parts by weight of an isocyanate prepolymer [trade name: "EDDYFOAM B-2009," manufactured by Kao Corporation], main constituents of which were a polyester-polyol and 4,4-diphenylmethane diisocyanate, and the resulting mixture was evacuated in a desiccator.

The resulting liquid mixture was used to measure a contact angle in accordance with the following method for measurement of a contact angle. As a result, the contact angle was found to be 46°.

The viscosity of this liquid mixture gradually increases. Therefore, the time period from the previous stirring of the polyol solution and the isocyanate prepolymer to the measurement of the contact angle was adjusted to four minutes.

[Measurement of Contact Angle]
1) The measurement atmosphere is kept windless at 25° C. and 55% RH.
2) As the flat plate made of the same material as the mold, an aluminum plate [average roughness Ra: 0.2–0.4 $\mu$m] is horizontally arranged. Thereafter, a silicone mold releasing agent [trade name: "PURAPOWER 2060," manufactured by Kao Corporation] is sprayed on its surface, and sufficiently wiped off with a waste cloth.
3) A given surface-treating agent is uniformly sprayed in the amount of 10 g/m$^2$ on the silicone mold releasing agent-sprayed surface (surface-treating agents which are solid at 25° C. are previously heated to a temperature of not lower than their melting points to melt and then sprayed).
4) The liquid molding material previously degassed by evacuation is collected with a syringe [Model "SS-02S," manufactured by TERUMO CORPORATION], and one droplet is dropped on the flat plate from the height of 10 cm from the surface of the flat plate in a manner so that the droplet of the liquid molding material has the weight of 0.10±0.02 g.
5) The time at which the droplet reaches the surface of the flat plate is counted as zero second. The change of the droplet is observed in accordance with the passage of time from the sideways direction of the droplet with a microscope [Product No. "VH-6200," manufactured by KEYENCE CORPORATION] as a CCD camera. After 60 seconds passed, the contact angle between the droplet and the flat plate is measured.

EXAMPLES 1 TO 4

Comparative Examples 1 to 4

[Production of Molded Articles Made of Polyether Polyurethane Foam]

There was used a mold for testing made of aluminum having an inner surface for forming on the tiptoe portion a sole pattern having 127 projections for antislipping wherein each of their height, width and length is about 5 mm, respectively, and wherein each vertical cross section of the projections was triangular. The temperature of the mold was adjusted to 50°±2° C. A mold releasing agent (trade name: "PURAPOWER 2060," manufactured by Kao Corporation) was sprayed on the inner surface, and wiped off with a waste cloth.

A surface-treating agent shown in Table 1 was used, and sprayed on the mold releasing agent-sprayed surface with a spray gun so that the amount of the surface treatment agent applied was 10 g/m$^2$. The contact angle between the liquid molding material and the surface-treating agent-sprayed surface was measured in accordance with the above method for measurement of a contact angle. The results are shown in Table 1.

One tank of a pouring-type low-pressure foaming machine was charged with an isocyanate prepolymer [trade name: "EDDYFOAM B-6009N," manufactured by Kao Corporation], and the liquid temperature was adjusted to 40° C., and the other tank thereof was charged with a liquid mixture prepared by mixing 100 parts by weight of a polyol composition solution [trade name: "EDDYFOAM AS-2045," manufactured by Kao Corporation] and 2 parts by weight of a catalyst [trade name: "EDDYFOAM AS-651-60C," manufactured by Kao Corporation], and the liquid temperature was adjusted to 40° C.

The isocyanate prepolymer was admixed with the liquid mixture, and the resulting mixture was stirred using this low-pressure foaming machine, so that an isocyanate index was 98. The resulting mixture was poured into the mold mentioned above to allow foaming. After 5 minutes passed from the pouring, the foamed product was taken out from the mold, to give a molded article made of a polyurethane foam. Each of the resulting molded articles had a density of about 0.65 g/cm$^3$ and hardness (Asker C) of 80±2.

Next, the shape transfer ratio of the resulting molded article made of a polyurethane foam was evaluated in accordance with the following method. The results are shown in Table 1.

[Shape Transfer Ratio]

In order to determine whether or not a molded article having a shape accurately corresponding to the shape of the inner surface of the mold is obtained, the shape transfer ratio was obtained in accordance with the following method.

The case where not less than 50% of the projections for antislipping of the molded article was lacked at its tip portion was evaluated as Score −3, and the number of the lacked projections is defined as "p"; the case where not less than 30% and less than 50% of the projections for antislipping of the molded article was lacked at its tip portion was evaluated as Score −2, and the number of the lacked projections is defined as "q"; the case where less than 30% of the projections for antislipping of the molded article was lacked at its tip portion was evaluated as Score −1, and the number of the lacked projections is defined as "r"; and the case where no lacked portions were observed was evaluated as Score 0, and the number of no lacked projections is defined as "s" (the total number of p+q+r+s is 127. The shape transfer ratio was calculated in accordance with the following equation:

$$[\text{Shape Transfer Ratio}]=[381+(-3)\times p+(-2)\times q+(-1)\times r+0\times s]\div 3.81$$

EXAMPLES 5 TO 8

Comparative Examples 5 to 8

[Production of Molded Articles Made of Polyester Polyurethane Foam]

The same procedures as in Examples 1 to 4 were carried out except that an isocyanate prepolymer [trade name: "EDDYFOAM B-2009," manufactured by Kao Corporation], and 100 parts by weight of a polyol solution [trade name: "EDDYFOAM AS-1210," manufactured by Kao Corporation] and 1.5 parts by weight of a catalyst [trade name: "EDDYFOAM AS-651-60C," manufactured by Kao Corporation], instead of the isocyanate prepolymer, the polyol solution and the catalyst used in Examples 1 to 4, to produce a molded article made of a polyurethane foam. Each of the resulting molded articles had a density of about 0.60 g/cm$^3$ and hardness (Asker C) of 80±2.

The shape transfer ratio of the resulting molded article made of a polyurethane foam was evaluated in the same manner as above. The results are shown in Table 1.

TABLE 1

| Example No. | Kind of Polyurethane Foam | Composition of Surface-Treating Agent (% by weight) | Contact Angle after 60 sec. (° C.) | Shape Transfer Ratio (%) |
|---|---|---|---|---|
| Example | | | | |
| 1 | Ether Polyurethane | Butyl stearate (100) | 18 | 93.5 |
| 2 | Ether Polyurethane | Ethyl stearate (100) | 17 | 94.6 |
| 3 | Ether Polyurethane | Octadecyl stearate (100) | 17 | 95.5 |
| 4 | Ether Polyurethane | Dioctyl ether (100) | 17 | 97.7 |
| Comp. Ex. | | | | |
| 1 | Ether Polyurethane | None | 43 | 34.9 |
| 2 | Ether Polyurethane | EMULGEN 903*[1] (100) | 32 | 50.3 |
| 3 | Ether Polyurethane | Linseed oil (100) | 31 | 57.5 |
| 4 | Ether Polyurethane | Lard (100) | 34 | 44.6 |
| Example | | | | |
| 5 | Ester Polyurethane | Butyl stearate (100) | 21 | 86.3 |
| 6 | Ester Polyurethane | Ethyl stearate (100) | 23 | 83.6 |
| 7 | Ester Polyurethane | Octadecyl stearate (100) | 22 | 83.6 |
| 8 | Ester Polyurethane | Dioctyl ether (100) | 22 | 90.2 |
| Comp. Ex. | | | | |
| 5 | Ester Polyurethane | None | 46 | 30.3 |
| 6 | Ester Polyurethane | EMULGEN 903*[1] (100) | 34 | 46.3 |
| 7 | Ester Polyurethane | Linseed oil (100) | 34 | 53.3 |
| 8 | Ester Polyurethane | Lard (100) | 35 | 42.1 |

(Note)
*[1]Trade name, manufactured by Kao Corporation

As is clear from the results shown in Table 1, it can be seen that all of the molded articles obtained in each Example have extremely high shape transfer ratios of because a contact angle-reducing substance showing a contact angle of not more than 30° is used.

EXAMPLES 9 TO 20

Comparative Examples 9 to 12
[Production of Molded Articles Made of Polyether Polyurethane Foam]

The same procedures as in Examples 1 to 4 were carried out except that spraying of the mold releasing agent on the mold for testing was omitted and that surface-treating agents shown in Table 2, which were previously admixed together at 25° C., were used, to produce a molded article made of a polyurethane foam. Each of the resulting molded articles had a density of about 0.65 g/cm$^3$ and hardness (Asker C) of 80±2.

The releasing property after production of the molded article made of a polyurethane foam was evaluated in accordance with the following method. The shape transfer ratio of the resulting molded article made of a polyurethane foam was evaluated in the same manner as above. The results are shown in Table 2.

[Releasing Property after Production]

The condition when taking out the resulting molded article from the mold was determined based on the following criteria:

⊙: the molded article not being entirely stuck to the inner surface of the mold at all;

○: the molded article being slightly stuck to the inner surface of the mold without posing any problems; and ×: the molded article being stuck to the mold, thereby making it impossible to take out the molded article from the mold.

EXAMPLES 21 AND 22

[Production of Molded Articles Made of Polyester Polyurethane Foam]

The same procedures as in Examples 5 to 8 were carried out except that spraying of the mold releasing agent on the mold for testing was omitted and that the surface-treating agents shown in Table 2, which were previously admixed together at 25° C. were used, to produce a molded article made of a polyurethane foam. Each of the resulting molded articles had a density of about 0.65 g/cm$^3$ and hardness (Asker C) of 80±2.

The releasing property after production and the shape transfer ratio of the resulting molded article made of a polyurethane foam were evaluated in the same manner as above. The results are shown in Table 2.

In Table 2, the following mold releasing agents were used: Mold releasing agent A: [trade name: "SUPER OIL B." manufactured by NOF Corporation]; Mold releasing agent B: dimethyl silicone oil [trade name: "TSF-451-50," manufactured by Toshiba Silicone Co., Ltd.]; Mold releasing agent C: dimethyl silicone oil [trade name: "TSF-451-300," manufactured by Toshiba Silicone Co., Ltd.]; Mold releasing agent D: a blend of silicone compounds [trade name: "PURAPOWER 20conc 60," manufactured by Kao Corporation].

TABLE 2

| Example No. | Kind of Polyurethane Foam | Composition of Surface-Treating Agent (% by weight) | Releasing Property | Shape Transfer Ratio (%) |
|---|---|---|---|---|
| Example | | | | |
| 9 | Ether Polyurethane | Butyl stearate (10) Mold releasing agent A (90) | ⊙ | 70.3 |
| 10 | Ether Polyurethane | Butyl stearate (20) Mold releasing agent A (80) | ⊙ | 95.0 |
| 11 | Ether Polyurethane | Butyl stearate (50) Mold releasing agent A (50) | ⊙ | 96.3 |
| 12 | Ether Polyurethane | Butyl stearate (80) Mold releasing agent A (20) | ○ | 92.5 |
| 13 | Ether Polyurethane | Butyl stearate (20) Mold releasing agent A (80) | ○ | 92.3 |
| 14 | Ether Polyurethane | Butyl stearate (20) Mold releasing agent | ⊙ | 96.3 |

TABLE 2-continued

| Example No. | Kind of Polyurethane Foam | Composition of Surface-Treating Agent (% by weight) | Releasing Property | Shape Transfer Ratio (%) |
|---|---|---|---|---|
| 15 | Ether Polyurethane | Butyl stearate (20) Mold releasing agent B (80) | ⊙ | 92.8 |
| 16 | Ether Polyurethane | Butyl stearate (20) Mold releasing agent C (80) | ⊙ | 89.3 |
| 17 | Ether Polyurethane | Dioctyl ether (20) Mold releasing agent D (80) | ○ | 93.6 |
| 18 | Ether Polyurethane | Dioctyl ether (20) Mold releasing agent A (80) | ⊙ | 98.5 |
| 19 | Ether Polyurethane | Dioctyl ether (20) Mold releasing agent B (80) | ⊙ | 95.3 |
| 20 | Ether Polyurethane | Dioctyl ether (20) Mold releasing agent C (80) | ⊙ | 91.6 |
| Comp. Ex. | | | | |
| 9 | Ether Polyurethane | Mold releasing agent A (100) | ⊙ | 33.6 |
| 10 | Ether Polyurethane | Mold releasing agent B (100) | ⊙ | 35.6 |
| 11 | Ether Polyurethane | Mold releasing agent C (100) | ⊙ | 38.3 |
| 12 | Ether Polyurethane | Mold releasing agent D (100) | ⊙ | 34.2 |
| Example | | | | |
| 21 | Ester Polyurethane | Butyl stearate (20) Mold releasing agent A (80) | ⊙ | 83.3 |
| 22 | Ester Polyurethane | Dioctyl ether (20) Mold releasing agent A (80) | ⊙ | 84.6 |

As is clear from the results shown in Table 2, it can be seen that each of the molded articles made of a polyurethane foam obtained in each Example has an extremely high shape transfer ratio, and also has excellent releasing properties after molding because the contact angle-reducing substance showing a contact angle of not more than 30° is used.

EXAMPLES 23 TO 26

Comparative Examples 13 to 15

There was used a mold made of aluminum having a shape corresponding to a molded article having a length of 255 mm, a width of 90 mm, a height of 30 mm, and a thickness of 5 mm, and also having 20 projections wherein each of length, width, and height is 20 mm, 20 mm, and 2 mm, respectively, as a design of its side surface. The temperature of the mold was adjusted to 70°±2° C. A mold releasing agent (trade name: "PURAPOWER 2060," manufactured by Kao Corporation) was sprayed on the inner surface, and wiped off with a waste cloth.

A contact angle-reducing substance shown in Table 3 was added to an isocyanate prepolymer [trade name: "EDDYFOAM B-3021," manufactured by Kao Corporation]. One tank of a pouring-type low-pressure foaming machine was charged with the resulting mixture, and the liquid temperature was adjusted to 35° C. The other tank thereof was charged with a liquid mixture prepared by mixing 100 parts by weight of a polyol solution [trade name: "EDDYFOAM AS-6-52U," manufactured by Kao Corporation], 1.3 parts by weight of a catalyst [trade name: "EDDYFOAM AS-651-60C," manufactured by Kao Corporation], 2 parts by weight of a crosslinking agent [trade name: "EDDYFOAM AS-60E," manufactured by Kao Corporation], 0.5 parts by weight of a foam stabilizer (a surfactant) [trade name: "EDDYFOAM AS-11S," manufactured by Kao Corporation], and the liquid temperature was adjusted to 40° C.

The isocyanate prepolymer was admixed with the liquid mixture and stirred using this low-pressure foaming machine so that an isocyanate index was 100. The resulting mixture was poured into the mold mentioned above to allow foaming. After 5 minutes passed from the pouring, the foamed product was taken out from the mold, to give a molded article made of a polyurethane foam. Each of the resulting molded articles had a density of about 0.28 g/cm$^3$ and hardness (Asker C) of 60±2.

Next, the shape transfer ratio of the resulting molded article made of a polyurethane foam was evaluated in accordance with the following method. The results are shown in Table 3.

When the upper portion of the projections is lacked in the length of not less than 2 mm during the molding of the molded article, its length is measured, and a sum (T) of length of all surface voids is calculated, and the shape transfer ratio is calculated from the following equation:

Shape Transfer Ratio=(400−T)÷400×100

The evaluation is made on the following criteria:

Criteria

○: transfer ratio being not less than 95 (extremely excellent appearance);

Δ: transfer ratio being not less than 92.5 and less than 95 (good appearance); and ×: transfer ratio being less than 92.5 (poor appearance).

TABLE 3

| Example No. | Contact Angle-Reducing Susbtance and Amount Thereof [Content in Isocyanate Prepolymer (% by weight)] | Evaluation of Shape Transfer Ratio (%) |
|---|---|---|
| Example | | |
| 23 | Butyl stearate (0.5) | ○ |
| 24 | Butyl stearate (1) | ○ |
| 25 | Butyl stearate (5) | ○ |
| 26 | Ethyl stearate (1) | ○ |
| Comp. Ex. | | |
| 13 | Octyl phthalate (1) | × |
| 14 | Octyl phthalate (5) | × |
| 15 | None | × |

As is clear from the above results shown in Table 3, it can be seen that all of the molded articles made of a polyurethane foam obtained in Examples 23 to 26 have high shape transfer ratios because the contact angle-reducing substance is added thereto.

INDUSTRIAL APPLICABILITY

According to the process of the present invention, there can be exhibited an effect that a molded article having a shape accurately corresponding to the shape of the inner surface of the mold can be produced without the generation of lowering surface properties such as surface void on the surface of the molded article.

Therefore, the process of the present invention can be suitably employed when producing a molded article used, for instance, for shoe soles.

What is claimed is:

1. A process for producing a molded article made of a polyurethane comprising:
   (A) adding a surface-treating agent comprising a contact angle-reducing substance to an isocyanate prepolymer;
   (B) mixing a polyol component with said isocyanate prepolymer;
   (C) pouring or injecting the resulting mixture into a mold; and
   (D) curing the mixture, to give said molded article;
   wherein the surface-treating agent is added to the isocyanate prepolymer under the condition that the contact angle between the mixture obtained in said step (B) and the inner surface of the mold is not more than 30°.

2. The process of claim 1, wherein said molded article is a shoe sole made of a polyurethane foam.

3. The process of claim 1, wherein the contact angle-reducing substance is an ester prepared from a fatty acid and a monohydric alcohol.

4. The process of claim 1, wherein the contact angle between the liquid molding material and the inner surface of the mold is adjusted to not more than 23°.

5. The process of claim 1, wherein a mold releasing agent is applied to said inner surface of the mold prior to pouring or injecting the liquid molding material in the mold.

6. The process of claim 1, wherein the contact angle-reducing substance is,contained in the isocyanate prepolymer in an amount of 0.1 to 7% by weight.

7. A surface-treating agent used in a process for producing a molded article made of a polyurethane comprising:
   (A) adding a surface-treating agent comprising a contact angle-reducing substance to an isocyanate prepolymer;
   (B) mixing a polyol component with said isocyanate prepolymer;
   (C) pouring or injecting the resulting mixture into a mold; and
   (D) curing the mixture, to give said molded article;
   wherein the contact angle-reducing substance reduces the contact angle to not more than 30° between the mixture obtained in said step (B) and a flat plate made of the same material as the mold when the mixture is dropped on the flat plate.

8. The surface-treating agent of claim 7, wherein the molded article is a shoe sole made of a polyurethane foam.

* * * * *